United States Patent [19]

Pettersson

[11] Patent Number: 4,692,609

[45] Date of Patent: Sep. 8, 1987

[54] METHOD AND APPARATUS FOR INDICATING AND SENSING PIPETTING POSITIONS

[75] Inventor: Ingvar Pettersson, Sundbyberg, Sweden

[73] Assignee: Scomas AB, Sundbyberg, Sweden

[21] Appl. No.: 872,008

[22] Filed: Jun. 9, 1986

[30] Foreign Application Priority Data

Jun. 18, 1985 [SE] Sweden ............................... 8503027

[51] Int. Cl.[4] ............................................... G01V 9/04

[52] U.S. Cl. .................................... 250/221; 356/244; 356/440

[58] Field of Search ..................... 250/221, 222.1, 576; 356/244, 440, 442; 422/67

[56] References Cited

U.S. PATENT DOCUMENTS

| | | | |
|---|---|---|---|
| 4,201,478 | 5/1980 | Gerlier et al. | 356/244 |
| 4,367,043 | 1/1983 | Sweet et al. | 356/440 |
| 4,384,201 | 5/1983 | Carroll et al. | 250/221 |

*Primary Examiner*—David C. Nelms

*Attorney, Agent, or Firm*—Burns, Doane, Swecker & Mathis

[57] ABSTRACT

A method and an apparatus for indicating and sensing pipetting positions in a pipetting sequence which is manually performed at a transparent conventional microtest plate is distinguished substantially thereby that a program control means (600) is brought to activate, in accordance with a previously programmed pipetting sequence, an illumination means (200;14) which distinguishingly illuminates the rim (115) of a test plate well (114) at which a manual pipetting operation in the sequence shall be carried out, in that the position of a pipette is sensed by means of sensing means (300) at the insertion of the pipette into a well (114) and in that the sensed pipette position is compared to the position for the well (114) indicated by the illumination means (200), and in that the comparison is carried out by means of a comparison means which, if the compared positions coincide, is brought to emit a signal to the control device (600) for initiation of the next sequence step, or, if the compared positions do not coincide, is brought to emit an alarm signal.

15 Claims, 4 Drawing Figures

METHOD AND APPARATUS FOR INDICATING AND SENSING PIPETTING POSITIONS

TECHNICAL FIELD

At the carrying out of certain tests, for example antigen detection or preparation operations, for example serial dilution operations, so called microtest plates are often used, which have an orthogonal matrix of 8×12 wells. In practice such plates are standardized with reference to number, size and mutual positions of the wells. At certain of these operations complex pipetting sequences are performed at such a test plate. The operator shall often carry out repetitive work at a series of test plates. The operator could then after some time of work loose concentration for a moment, and then by mistake jump over a pipetting operation at a certain well or carry out two pipetting operations at one and the same well or generally carry out a pipetting operation at the wrong well in relation to the predetermined pipetting sequence so that the result of the operation becomes misleading, unreliable or faulty.

An object with the invention is to provide a method and an apparatus which permits reduction of said risks for mistakes of said types, primarily in connection with the pipetting sequences which are carried out manually, especially at microtest plates of said type.

CHARACTERIZATION OF THE INVENTION

A method for indicating and sensing pipetting positions in a pipetting sequence which is manually carried out at a test plate having a matrix of wells is distinguished substantially thereby that a program control means is brought to activate, in accordance with a previously programmed pipetting sequence, an illumination means which distinguishingly illuminates the rim of a well at which a manual pipetting operation of the sequence shall be carried out, in that the position for a pipette is sensed by means of sensing means at the insertion of the pipette into a well, and in that the sensed pipette position is compared to the position of the well indicated by the illumination means, and in that the comparison is carried out by means of comparing means which either, if the compared positions coincide, is brought to emit a signal to the control means for initiation of next program step, or, if the compared positions do not coincide, is brought to emit an alarm signal. The test plate, for example a microtest plate, is preferably transparent, the tubular well walls of the plate being substantially separate from each other. Then the well rim can be illuminated by irradiation or illumination of the bottom rim of the well from the bottom side of the plate. The well wall then operates as a light guide, and the rim of the well becomes distinguishingly illumitated. The illumination effect can be improved by having the upper rim of the wells coated with a fluorescent material.

The illumination means can comprise a plurality of illumination devices in a station for the plate, each illumination device being positioned aligned with an associated well in a plate which is correctly positioned in the station. The program control means can then be brought to activate the illumination device which corresponds to the well at which, according to the program sequence, a pipetting operation shall be carried out. The well matrix of the test plate can be arranged as mutually intersecting sets of parallel rows. The sensing means can then comprise a light source and a light detector on opposite sides of each matrix row of the plate as correctly positioned in the station, at a level above the space for the plate. Then the pipette position can be sensed by output signal change from the two detectors which by the pipette are screened off from their light sources.

An apparatus for indicating and sensing pipetting positions in a pipetting sequence which is carried out manually at a test plate having a matrix of wells is substantially distinguished by a station which is arranged to receive a test plate in a predetermined orientation and a pre-determined position, an illuminating device in the station for distinguishing illumination of the rim of a well at which a pipetting operation shall be carried out, a program control means which is preprogrammed for a certain pipetting sequence and which is arranged to control the illumination means to illuminate the well in the test plate at which a pipetting operation shall be carried out in accordance with the sequence, sensing means in the station for sensing the position for a pipette which is inserted in a well, and a comparison means for comparing the position of the illuminated well and the sensed pipette position, said comparison means being arranged, if the compared positions coincide, to bring the program control means to initiate next sequence step, or, if the positions do not coincide, emit a signal which triggers an alarm. The station can consist of an open box which permits unequivocal placement of the test plate therein. If the test plate is transparent and the well walls are substantially separate from each other, the illumination means can have the shape of a matrix of illumination devices in the bottom surface of the box, said matrix coinciding with the well matrix of the plate, said program control means being arranged to especially activate the illumination device which corresponds to the well in the test plate at which a pipetting operation shall be carried out in accordance with the sequence.

When the test plate comprises a matrix of wells comprising two mutually intersecting sets of mutually parallel straight well rows, the sensing means can comprise a detector and a radiation source on opposite sides over each row of the plate as positioned in the station, in a plane above the space for the test plate in the station, whereby the two detectors which are screened off by the pipette at a pipetting operation indicate the position of the pipette.

The invention which is defined in the apended claims, will in the following be described in the form of an example with reference to the appended drawing.

DRAWING

EMBODIMENT

Figure 2:
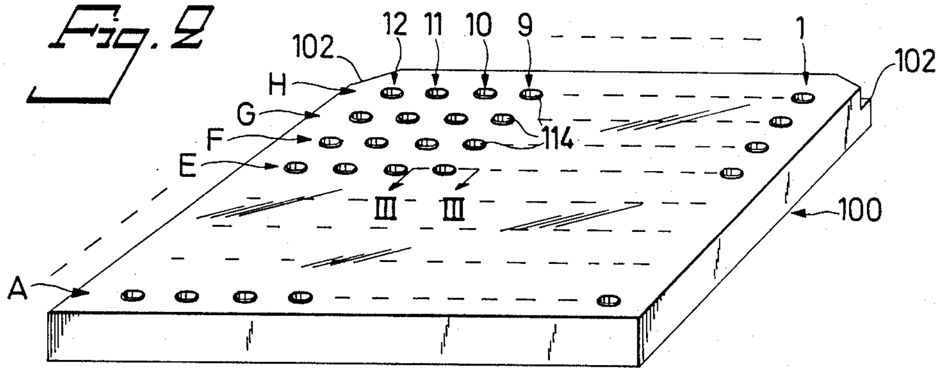
FIG. 2 shows schematically a microtest plate of conventional design.
Figure 3:
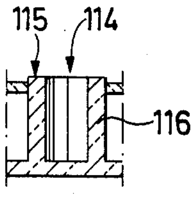
FIG. 3 shows a section taken along line III—III in FIG. 2.

FIG. 2 shows a conventional microtest plate 100 which has wells 114 in an orthogonal matrix of well rows A to H and 1 to 12. The plate 100 has an orthogonal parallelepipedic exterior configuration, except that one long side where the upper corner portions 102 of the plate 100 are removed. The plate 100 is transparent and the wells 114 thereof have tubular well walls 116, the walls 116 of the wells 114 being substantially separate from each other. Usually the upper rim 115 of the wells 114 protrude freely upwardly.

Figure 1:
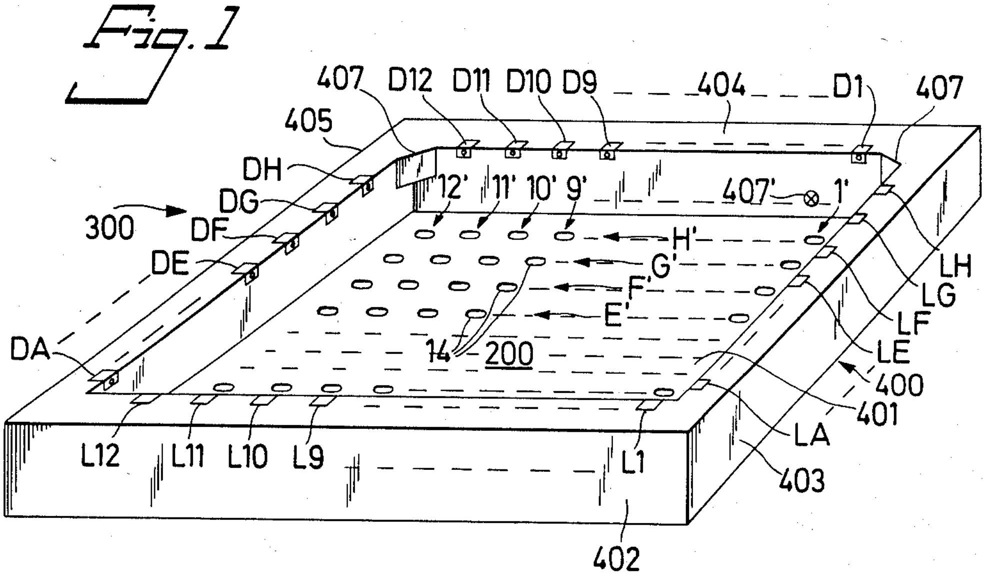
FIG. 1 shows schematically a component of an apparatus according to the invention.

In FIG. 1 there is shown an apparatus component in the form of an upwardly open box 400. The box has a bottom surface 401, the dimensions of which correspond to those for the base surface of the test plate 100. In the inner corners between one longer wall 404 of the box and the shorter walls 403, 404 of the box there are corner blocks 407 which are complementary to the corner cut outs 102 of the test plate 100, so that the plate 100 can be correctly placed in the box 400 in an uneqivocal manner.

On the bottom surface 401 of the box 400 there is an illumination means 200. The illumination means comprises a plurality of light sources 14. The light sources 14 are arranged in a first set of mutually parallel rows 1'–12' and a second set of mutually parallel rows A'–H', said both sets of rows intersecting each other at right angles. When a test plate 100 is correctly positioned in box 400, each light source 14 in the matrix 1'–12'$\times$A'–H' will be positioned opposite an associated well 114 in the well matrix 1–12$\times$A–H of the plate 100.

On the side walls 402–405 of the box 400, at a distance above the box bottom 401 which is larger than the height of the plate 100, there are radiation sources and detectors. A radiation source and an associated detector are arranged on opposite sides of each row 1'–12', A'–H', in a normal plane to the bottom surface 401 of the box through respective row of light sources 14. Thus, there is shown on the box wall 402 a series of light sources $L_1$–$L_{12}$ and on the opposite box wall 404 a series of detectors $D_1$–$D_{12}$. On the box wall 403 there are light sources LA–LH and on the box wall 405 there is a series of detectors DA–DH.

Assuming that a test plate 100 according to FIG. 2 is positioned in a box according to FIG. 1, and that a pipette is moved down into a certain well 114 in the test plate 100, the pipette will screen off the light flow to one of the detectors $D_1$–$D_{12}$ and one of the detectors DA–DH. The output signal from these both detectors are then changed, and the changed output signals from said detectors indicate the position at which the pipette is present.

Figure 4:
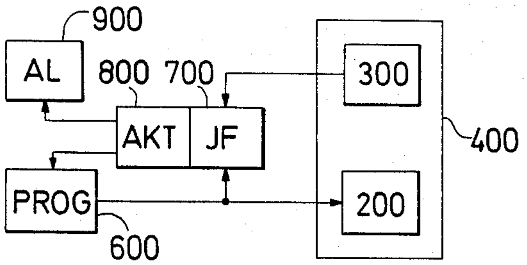
FIG. 4 shows schematically the principle structure of the inventive apparatus.

With reference to FIG. 4 one can assume that a program control apparatus 600 for example a computer, is programmed to activate light sources 14 in a certain sequence. When the program control device 600 is started, a certain light source 14 is thus activated in accordance to the programmed sequence. Light from the light source 14 is transmitted through the microtest plate, through the well wall 116 up to the upper well rim 115. If the light source 14 is arranged to emit light of a distinguishing colour intensity or pulsing, the operator can easily identify the well 114 at which a pipetting operation shall be carried out in accordance with the programmed sequence. The identification effect can be increased thereby that the rims 115 of the wells 114 are coated with a fluorescent material. When an operator has inserted a pipette (not shown) into a well, the position of the pipette is sensed by means of the detectors $D_1$–$D_{12}$ and DA–DH, which form a sensing means 300. The position of the activated light source 14 is compared to the pipette position which is sensed by the sensing means 300 in a comparison means 700, which can be considered to contain an activation means 800.

In dependence on the outcome of the comparison in the comparison means 700 the activation means 800 triggers an alarm signal in an alarm device 900 or the activation means 800 emits a signal which permits the program control means 600 to initiate the next work step in the programmed sequence, that is to activate the light source 14 which illuminates the rim 115 of that well 114 in the test plate at which the next pipetting operation of the sequence shall be carried out.

Above a specific embodiment of the apparatus according to the invention has been described in connection to a generally described method for indication and control of pipetting operations in a predetermined sequence, but it should be clear that the apparatus can be modified in several respects, within the scope of the invention. Thus, the separate light sources 14 in the bottom surface 401 of the box 400 can be replaced by a guidable light source which from above illuminates the respective well of the test plate 100. Further the structure of the apparatus component according to FIG. 1 can be modified, for example so that the sensing means 300 and the illumination device 200 are mounted on separate structural elements, but then these elements should have mutually fixed positions relative to the elements which form the station 400.

Further a sensing means 407 can, as indicated in figure 1, be arranged to sense the presence of a test plate 100 as a prerequisite for starting of the program control means 600. As realized by the artsmen, the scheme according to FIG. 4 can be completed with numerous conventional details which simplify the carrying out of the pipetting work, for example reset means for cutting a possible alarm emitted by the alarm device 900.

With reference to the illumination device 200 the separate light sources 400 can consist of light diodes, the output end of light guiding optical fibres on the light. Further the respective light sources 14 can be formed thereby that each row 1'–12' and A'–H' is associated with a light source and thereby that beam splitting mirrors or grids are arranged in each position for a light source 14 so that the added effect of light which has been reflected upwardly by such mirrors or grids from a light source associated with a row in each of the row sets 1'–12' and A'–H', bring about a distinguishing illumination of the rim 115 of a certain well 114 in the test plate 100.

The structure of the means 600, 700, 800 and 900 lies within the competence of the program control artsmen.

What is claimed is:

1. A method for indicating and sensing pipetting positions in a pipetting sequence which is manually performed at a test plate (100) having a matrix of wells (114) characterized in that a program control means (600) is brought to activate, in accordance with a previously programmed pipetting sequence, an illumination means (200;14) which distinguishingly illuminates the rim (115) of a well (114) at which a manual pipetting operation in the sequence shall be carried out, that the position for a pipette is sensed by means of sensing means (300) when the pipette is inserted into a well (114), and in that the sensed pipette position is compared with the position for the well (114) indicated by the illumination means (200) and in that the comparison is carried out by means of a comparison means which is brought, if the compared positions coincide, to emit a signal to the control means (600) for initiation of the next sequence step, or, if the compared positions do not coincide, is brought to emit an alarm signal.

2. A method according to claim 1, wherein the test plate is transparent, and the wells have tubular walls (16) which are substantially separate from each other characterized in that the well rim (115) is illuminated by irradiation or illumination of the bottom rim on the well (114) from the lower side of the plate (100).

3. A method according to claim 1, wherein the illumination means comprises a plurality of illumination devices (14) in a station (400) for the plate (100), and each illumination means (14) lies opposite to an associated well (114) in a plate which is unequivocally placed and oriented in the station, characterized in that the program control means (600) is brought to activate that illumination device (114) which corresponds to the well (114) at which, according to the program sequence, a pipetting operation shall be carried out.

4. A method according to claim 1, wherein the matrix of wells (114) of the test plate (100) is arranged as two mutually intersecting sets of parallel well rows (A–H; 1–12), and wherein the sensing means comprises an irradiation source ($L_1$–$L_{12}$; LA–LH) and a radiation detector ($D_1$–$D_{12}$; DA–DH) on opposite sides of each matrix row in the plate (100) as unequivocally positioned in the station, at a level above the space in the station for the plate, characterized in that the pipette position is sensed by output signal change from those two detectors which are screened off by the pipette from their associated radiation sources.

5. A method according to claim 2, wherein the illumination means comprises a plurality of illumination devices (14) in a station (400) for the plate (100), and each illumination means (14) lies opposite to an associated well (114) in a plate which is unequivocally placed and oriented in the station, characterized in that the program control means (600) is brought to activate that illumination device (114) which corresponds to the well (114) at which, according to the program sequence, a pipetting operation shall be carried out.

6. A method according to claim 2, wherein the matrix of wells (114) of the test plate (100) is arranged as two mutually intersecting sets of parallel well rows (A–H; 1–12), and wherein the sensing means comprises an irradiation source ($L_1$–$L_{12}$; LA–LH) and a radiation detector ($D_1$–$D_{12}$; DA–DH) on opposite sides of each matrix row in the plate (100) as unequivocally positioned in the station, at a level above the space in the station for the plate, characterized in that the pipette position is sensed by output signal change from those two detectors which are screened off by the pipette from their associated radiation sources.

7. A method according to claim 3, wherein the matrix of wells (114) of the test plate (100) is arranged as two mutually intersecting sets of parallel well rows (A–H; 1–12), and wherein the sensing means comprises an irradiation source ($L_1$–$L_{12}$; LA–LH) and a radiation detector ($D_1$–$D_{12}$; DA–DH) on opposite sides of each matrix row in the plate (100) as unequivocally positioned in the station, at a level above the space in the station for the plate, characterized in that the pipette position is sensed by output signal change from those two detectors which are screened off by the pipette from their associated radiation sources.

8. Apparatus for indicating and sensing pipetting positions in a pipetting sequence which is manually performed at a test plate (100) having a matrix of wells (114), characterized by a station (400) which is arranged to receive the test plate (100) in a predetermined orientation and a predetermined position, an illumination device (200) in the station for distinguishing illumination of the rim (115) of a well (114) at which a pipetting operation is to be performed, a program control means (600) which previously has been programmed for a certain pipetting sequence and which is arranged to control the illumination means (200) to illuminate that well (114) in the test plate (100) at which a pipetting operation shall be carried out according to the sequence, a sensing means (300) in the station for sensing the position for a pipette which is inserted in a well, and a comparison means (700,800) for comparing the position of the illuminated well (114) and the sensed pipette position, said comparison means (700,800) being arranged, if the compared positions coincide, to bring the program control means (600) to initiate the next sequence step or, if the positions do not coincide, to emit an alarm triggering signal.

9. Apparatus according to claim 8, characterized in that the station comprises an upwardly open box (400) which is shaped to permit an unequivocal placing of the test plate therein.

10. Apparatus according to claim 8 for use with a transparent test plate (100), the well walls (116) of which are substantially separate from each other, characterized in that the illumination means (200) has the form of a matrix (1′–12′×A′–H′) of illumination devices (14) in the bottom surface (401) of the box (400), said matrix coinciding with the well matrix (A–H×1–12) of the test plate (100), and in that the program control means (600) is arranged to especially activate the illumination device (14) which corresponds to that well (114) in the test plate (100) at which a pipetting shall be carried out according to the sequence.

11. Apparatus according to claim 8, for use at a test plate (100) with a matrix of wells (114) comprising two mutually intersecting sets (A–H;1–12) of mutually parallel straight well rows, characterized in that the sensing means (300) comprises a detector and an illumination source on opposite sides of each row in the plate (100) placed in the station (400), at a level above the space in the station for the test plate (100), whereby the two detectors which are screened off by the pipette at a pipetting operation indicate the position of the pipette.

12. Apparatus according to claim 9 for use with a transparent test plate (100), the well walls (116) of which are substantially separate from each other, characterized in that the illumination means (200) has the form of a matrix (1′–12′×A′–H′) of illumination devices (14) in the bottom surface (401) of the box (400), said matrix coinciding with the well matrix (A–H×1–12) of the test plate (100), and in that the program control means (600) is arranged to especially activate the illumination device (14) which corresponds to that well (114) in the test plate (100) at which a pipetting shall be carried out according to the sequence.

13. Apparatus according to claim 9, for use at a test plate (100) with a matrix of wells (114) comprising two mutually intersecting sets (A–H; 1–12) of mutually parallel straight well rows, characterized in that the sensing means (300) comprises a detector and an illumination source on opposite sides of each row in the plate (100) placed in the station (400), at a level above the space in the station for the test plate (100), whereby the two detectors which are screened off by the pipette at a pipetting operation indicate the position of the pipette.

14. Apparatus according to claim 10, for use at a test plate (100) with a matrix of wells (114) comprising two mutually intersecting sets (A–H; 1–12) of mutually parallel straight well rows, characterized in that the sensing means (300) comprises a detector and an illumination source on opposite sides of each row in the plate (100) placed in the station (400), at a level above the space in the station for the test plate (100), whereby the two detectors which are screened off by the pipette at a pipetting operation indicate the position of the pipette.

15. Apparatus according to claim 12, for use at a test plate (100) with a matrix of wells (114) comprising two mutually intersecting sets (A–H; 1–12) of mutually parallel straight well rows, characterized in that the sensing means (300) comprises a detector and an illumination source on opposite sides of each row in the plate (100) placed in the station (400), at a level above the space in the station for the test plate (100), whereby the two detectors which are screened off by the pipette at a pipetting operation indicate the position of the pipette.

* * * * *